(12) United States Patent
Kalu

(10) Patent No.: US 9,349,120 B2
(45) Date of Patent: May 24, 2016

(54) SYSTEM AND METHOD FOR SILENCING NOTIFICATIONS FOR A MESSAGE THREAD

(75) Inventor: Kalu Onuka Kalu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 757 days.

(21) Appl. No.: 12/713,577

(22) Filed: Feb. 26, 2010

(65) Prior Publication Data

US 2010/0262666 A1 Oct. 14, 2010

Related U.S. Application Data

(60) Provisional application No. 61/167,542, filed on Apr. 8, 2009.

(51) Int. Cl.
| | | |
|---|---|---|
| G06F 15/16 | (2006.01) | |
| G06Q 10/10 | (2012.01) | |
| H04L 12/58 | (2006.01) | |

(52) U.S. Cl.
CPC ............ *G06Q 10/107* (2013.01); *H04L 12/587* (2013.01); *H04L 51/24* (2013.01)

(58) Field of Classification Search
CPC .......... H04L 51/16; H04L 51/22; H04L 51/24
USPC .......... 709/206, 217, 219, 223, 224, 232, 240
See application file for complete search history.

(56) References Cited

U.S. PATENT DOCUMENTS

| | | | | |
|---|---|---|---|---|
| 5,283,856 A * | 2/1994 | Gross et al. | | 706/47 |
| 6,442,565 B1 * | 8/2002 | Tyra et al. | | |
| 7,890,085 B2 * | 2/2011 | Chiu et al. | | 455/412.2 |
| 8,176,126 B2 * | 5/2012 | Davis et al. | | 709/206 |
| 2002/0087643 A1 * | 7/2002 | Parsons et al. | | 709/206 |
| 2002/0087646 A1 * | 7/2002 | Hickey et al. | | 709/206 |
| 2003/0167310 A1 * | 9/2003 | Moody et al. | | 709/206 |
| 2004/0133810 A1 * | 7/2004 | Brischke et al. | | 713/201 |
| 2004/0225718 A1 * | 11/2004 | Heinzel et al. | | 709/206 |
| 2005/0181836 A1 * | 8/2005 | Kamat | | 455/567 |
| 2006/0075040 A1 * | 4/2006 | Chmaytelli | | 709/206 |
| 2006/0104423 A1 * | 5/2006 | Heidloff et al. | | 379/88.12 |
| 2008/0098071 A1 * | 4/2008 | Jones et al. | | 709/206 |
| 2008/0114884 A1 * | 5/2008 | Hewes et al. | | 709/229 |
| 2008/0294727 A1 | 11/2008 | Moody et al. | | |
| 2008/0294730 A1 * | 11/2008 | Oral et al. | | 709/206 |
| 2008/0301250 A1 | 12/2008 | Hardy et al. | | |
| 2009/0204681 A1 * | 8/2009 | Sun | | 709/206 |
| 2011/0022674 A1 * | 1/2011 | Callanan et al. | | 709/206 |

(Continued)

OTHER PUBLICATIONS

Matias Erny Reichl Hoffman, Response to Office Communication pursuant to Article 94(3) EPC, filed Jul. 7, 2011, in respect of European Patent Application No. 10154855.0.

(Continued)

*Primary Examiner* — Quang N Nguyen
(74) *Attorney, Agent, or Firm* — Ridout and Maybee LLP

(57) ABSTRACT

Methods, systems, and computer programming products are provided for silencing message threads. Incoming messages related to the same matter are grouped into one or more message threads. A user can select to silence a message thread. Once a message thread has been silenced, the user will no longer receive notifications of new messages added to the thread. Methods, systems, and computer programming products display new incoming electronic messages flagged as silenced in the inbox together with any message thread not flagged as silenced.

24 Claims, 11 Drawing Sheets

(56) References Cited

U.S. PATENT DOCUMENTS

| | | | |
|---|---|---|---|
| 2012/0151196 A1* | 6/2012 | May et al. | 713/1 |
| 2013/0095823 A1* | 4/2013 | Klassen | 455/432.1 |
| 2013/0159879 A1* | 6/2013 | Affronti et al. | 715/752 |

OTHER PUBLICATIONS

Extended European Search Report pursuant to Rule 62 dated May 7, 2010.

MERH IP Response to communication pursuant to Rule 62 dated Aug. 5, 2010.

European Patent Office, Communication pursuant to Article 94(3) EPC for European Patent Application No. 10 154 855.0, dated Mar. 4, 2011.

Norton Rose, Response to Examination Report dated May 17, 2013, issued in Canadian Patent Application No. 2,694,885.

Canadian Intellectual Property Office, Examination Report dated Nov. 19, 2012, issued in Canadian Patent Application No. 2,694,885.

Canadian Intellectual Property Office, Examination Report dated Dec. 17, 2013, issued in Canadian Patent Application No. 2,694,885.

* cited by examiner

SYSTEM AND METHOD FOR SILENCING NOTIFICATIONS FOR A MESSAGE THREAD

CROSS REFERENCE TO RELATED APPLICATIONS

This application claims the benefit of, and by this reference incorporates the entirety of, U.S. Provisional Patent Application Ser. No. 61/167,542, filed 8 Apr. 2009 and entitled SILENCING NOTIFICATIONS FOR A MESSAGE THREAD.

TECHNICAL FIELD

The present disclosure relates generally to electronic messages, and more particularly to systems and methods for silencing notifications for electronic messages.

BACKGROUND

Electronic messages, such as electronic mail messages and messages posted to group sites, can be grouped into message threads. Each message thread can relate to a particular matter such as a particular topic of conversation or an activity. For example, a user may be part of an email group which is involved in an ongoing discussion. Each email in the discussion could be included in the same message thread. A user may receive a notification each time an electronic message is received. Notifications could include, for example, auditory user alerts such as ring tones, visual alerts such as flashing lights or pop-ups and physical alerts such as vibrations.

Similarly, a user may be a member of a centralized group site which provides the capability of a group discussion. For example, the group may be a set of users who share a common relationship or interest (e.g. family, co-workers, book club, small business, golf foursome, etc.). The group site may allow data to be shared, updated and commented on by group members. Each group discussion regarding a particular matter may be considered a message thread. A matter could be, for example, a topic of conversation among the group members or an activity such as, for example, the creation of a list or the uploading of a photograph by a member of the group. The user may receive a notification each time a message or comment is sent or posted to a group site of which they are a member.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

In one aspect, the present application provides a communication system configured to silence notifications for incoming electronic messages, the system comprising a data processor, media readable by the data processor and a communications subsystem: the communication subsystem adapted for receiving the incoming electronic messages; and the media readable by the data processor comprising coded program instructions adapted to cause the processor to: determine that a new incoming electronic message is associated with a message thread; determine that the message thread has been flagged as silenced; and override a currently-enabled notification setting to prevent a receipt notification pertaining to new incoming electronic messages associated with the message thread from being activated.

In another aspect, the present application provides a method for silencing notifications for incoming electronic messages to a communication system, the communication system comprising a data processor, media readable by the data processor and a communications subsystem, the communications subsystem adapted to receive the incoming electronic messages, the method comprising: receiving a new incoming electronic message; identifying the new incoming message as associated with one or more message threads; determining that a message thread associated with the new incoming message has been flagged as silenced; and overriding at least one currently-enabled notification setting to prevent a notification pertaining to receipt of the new incoming message from being activated.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Figure 1:
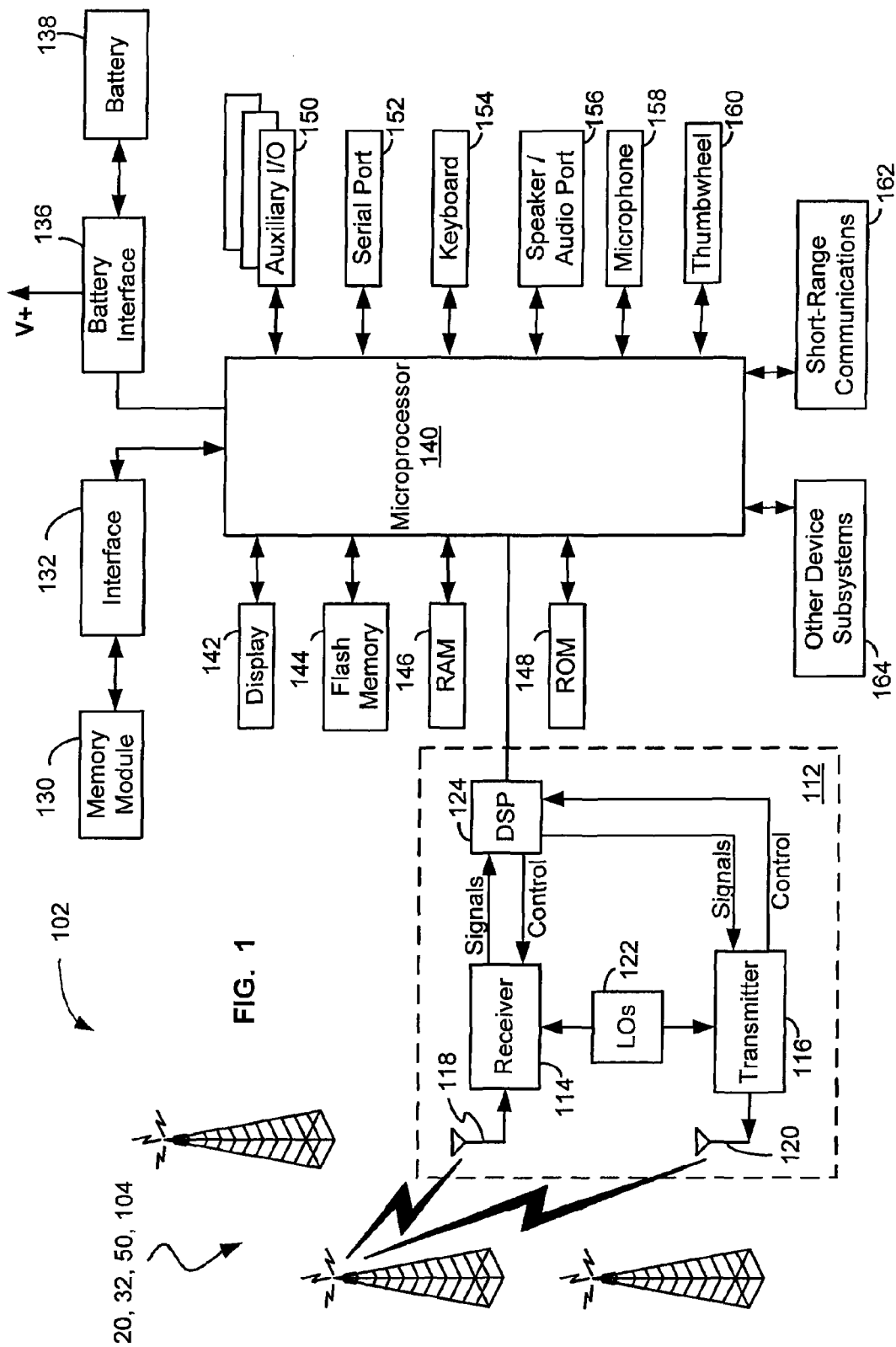
FIG. 1 shows a schematic diagram of a wireless device suitable for communications in accordance with the disclosure herein.

Reference is first made to FIG. 1, which shows a block diagram illustrating a wireless device 102 that may be used for communications over a network in accordance with various aspects of the present disclosure. Wireless device 102 communicates through a wireless communication network 104 (e.g., an enterprise network 20, a PLMN 50 and/or a WLAN 32). Wireless network 104 includes antenna, base stations, and supporting radio equipment as for supporting wireless communications between wireless device 102 and other devices connected to wireless network 104. Wireless network 104 may be coupled to a wireless network gateway and to a wide area network, shown in FIG. 2.

In various embodiments, wireless device 102 is a two-way mobile communication device having at least voice and data communication capabilities, including the capability to communicate with other computer systems. Depending on the functionality provided by wireless device 102, it may be referred to as a wireless handheld device, a mobile device, a data messaging device, a two-way pager, a cellular telephone with data messaging capabilities, a wireless Internet appliance, a data communication device (with or without telephony capabilities), a clamshell device, or a flip-phone. Wireless device 102 may communicate with any one of a plurality of fixed transceiver stations within its geographic coverage area.

A wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In various embodiments, antenna elements 118 and 120 may be embedded or internal to wireless device 102. As will be apparent to those skilled in the field of communications, the particular design of communication subsystems 112 depends on the system(s), such as enterprise network 20, PLMN 50 and/or WLANs 32, with which wireless device 102 is intended to communicate.

A wireless device 102 may send and receive communication signals to and from an enterprise server of the enterprise network 20 through, for example, PLMN 50 and/or one of WLANs 32. Signals received by the antenna 118 are input to receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by DSP 124. These DSP-processed signals are input to transmitter 116 for digital-to-analog (D/A) conversion, frequency up conversion, filtering, amplification, and transmission via antenna 120. DSP 124 not only processes communication signals, but also provides for receiver and transmitter control. For example, the gains applied to communication signals in receiver 114 and transmitter 116 may be adaptively controlled through automatic gain control algorithms implemented in DSP 124.

Network access may be associated with a subscriber or user of a wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of wireless device 102. Alternatively, wireless device 102 may have an integrated identity modul0065 for use with systems such as Code Division Multiple Access (CDMA) systems.

A wireless device 102 may also include a battery interface 136 for receiving one or more rechargeable batteries 138. Battery 138 may provide electrical power to at least some of the electrical circuitry in wireless device 102, and battery interface 136 provides a mechanical and electrical connection for battery 138. Battery interface 136 may be coupled to a regulator (not shown) which provides power V+ to the circuitry of wireless device 102.

Wireless device 102 may include one or more microprocessors 140 which control the overall operation of wireless device 102. Communication functions, including at least data and voice communications, may be performed through communication subsystem(s) 112. Microprocessor(s) 140 may also interact with additional device subsystems, such as modem 128, primary display 142, optional secondary display 143, flash memory 144, random access memory (RAM) 146, read-only memory (ROM) 148, auxiliary input/output (I/O) subsystem(s) 150, data port(s) such as Universal Serial Bus (USB) port 152, keyboards or keypads 154, speakers or audio ports 156 for connecting to, for example a set of headphones or an earpiece, microphones 158, clickable thumbwheels or thumbwheels 160, open/close sensors 161, short-range communications subsystems 162, and any other device subsystems generally designated as 164. Some of subsystems shown in FIG. 1 perform communication-related functions, whereas other subsystems may provide "resident" or on-device functions. Notably, some subsystems, such as keypads 154, primary displays 142, secondary displays 143, and clickable thumbwheels 160, for example, may be used for both communication-related functions, such as displaying notifications or entering a text message for transmission through, for example, PLMN 50 and/or one of WLANs 32, and executing device-resident functions such as a clock, a calculator or a task list. In some examples, primary displays 142 and/or secondary displays 143 may be touch-sensitive displays, such as capacitive touch screen displays, for receiving tactile input. Where one or more touch-sensitive displays are used, one or more input subsystems, such as keyboards or keypads 154 and clickable thumbwheels 160, may be omitted and a virtual keyboard or keypad presented by the touch-sensitive display is used instead. In some examples, there may be one or more physical input subsystems provided in addition to one or more touch-sensitive displays. The touch-sensitive display may provide different virtual input interfaces as suitable. Operating system software used by microprocessor(s) 140 may be stored in persistent store(s) such as flash memory 144, which may include or be supplemented by or substituted by for example ROM 148 and/or similar storage element(s). Those skilled in the art will appreciate that the operating system, specific device applications, or parts thereof, may be temporarily loaded into a volatile store such as RAM 146.

Microprocessor(s) 140, in addition to their operating system functions, can enable execution of software applications on wireless device 102. A predetermined set of applications that control basic device operations, including data and voice communication applications, may be installed on wireless device 102 during or after manufacture. Wireless device 102 may include a personal information manager (PIM) application having the ability to organize and manage data items relating to a user such as, but not limited to, instant messaging, email, calendar events, voice mails, appointments, groups and task items. One or more memory stores may be available on wireless device 102 to facilitate storage of information, such as flash memory 144, RAM 146, ROM 148, memory module 130, or other types of memory storage devices or FLASH memory cards represented by the other device subsystems 164, such as Secure Digital (SD) cards or mini SD cards, etc.

PIM and/or media applications have the ability to send and receive data items via PLMN 50 and/or one of WLANs 32 or via a link to a computer system(s). The link to such computer system(s) may be via serial port 152 or short-range communications subsystem 162. In an embodiment, PIM and/or media data items are seamlessly combined, synchronized, and updated, for example, through PLMN 50 and/or one of WLANs 32, with wireless device user's corresponding data items stored and/or associated with a host computer system thereby creating a mirrored or partially mirrored host computer on wireless device 102 with respect to such items. This may be advantageous where for example the host computer system is a wireless device user's office computer system. Additional applications may also be loaded onto wireless device 102 through, for example, PLMN 50 and/or one of WLANs 32, the auxiliary I/O subsystem 150, serial port 152, short-range communications subsystem 162, or any other suitable subsystem 164, and installed by a user in RAM 146 or a non-volatile store such as ROM 148 for execution by microprocessor 140. Such flexibility in application installation increases the functionality of wireless device 102 and may provide enhanced on-device functions, communication-related functions, or both. For example, secure communication applications may enable electronic commerce functions and other such financial transactions to be performed using wireless device 102.

In a data communication mode, a received data signal representing information such as a text message, an email message, a media file to be transferred, or Web page download may be processed by communication subsystem(s) 112 and input to microprocessor(s) 140. Microprocessor(s) 140 may further process such signal(s) for output to primary display 142, secondary display 143, or alternatively to the auxiliary I/O device 150. A user of wireless device 102 may also compose data items, such as email messages, for example, using keypad 154 and/or clickable thumbwheel 160 in conjunction with primary display 142 and possibly auxiliary I/O device 150. Keypad 154 maybe either a complete alphanumeric keypad or telephone-type keypad. These composed items may be transmitted through communication subsystem 112 or via short range communication subsystem 162.

For voice communications, the overall operation of wireless device 102 may be similar, except that the received signals may be output to speaker or audio port 156 and signals for transmission may be generated by a transducer such as microphone 158. Alternative voice or audio I/O subsystems, such as voice message recording subsystem(s), may also be implemented on wireless device 102. Although voice or audio signal output is typically accomplished primarily through speakers or audio ports 156, primary displays 142 or secondary displays 143 may also be used to provide an indication of the identity of a calling party or the communication type, duration of a voice call, or other voice call related information. Stereo headphones or earpieces may also be used in place of or in addition to speaker 156.

USB ports 152 may be implemented in personal digital assistant (PDA) type communications device for, for example, synchronization with a user's computer. USB ports 152 can enable a user to set preferences through an external device or software application and can extend the capabilities of a wireless device 102 by providing for information or software downloads to wireless device 102 other than through PLMN 50 and/or one of WLANs 32. Such alternate download paths may, for example, be used to load software or data files onto wireless device 102 through a direct, reliable and trusted connection.

Short-range communications subsystem 162 is an additional optional component which provides for communication between wireless device 102 and different systems or devices, which need not necessarily be similar devices. For example, subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, short-range communications subsystem 162 may be a wireless networking communications subsystem, conforming to IEEE 802.11 standards such as one or more of 802.11b, 802.11g, and/or 802.11n.

Figure 2:
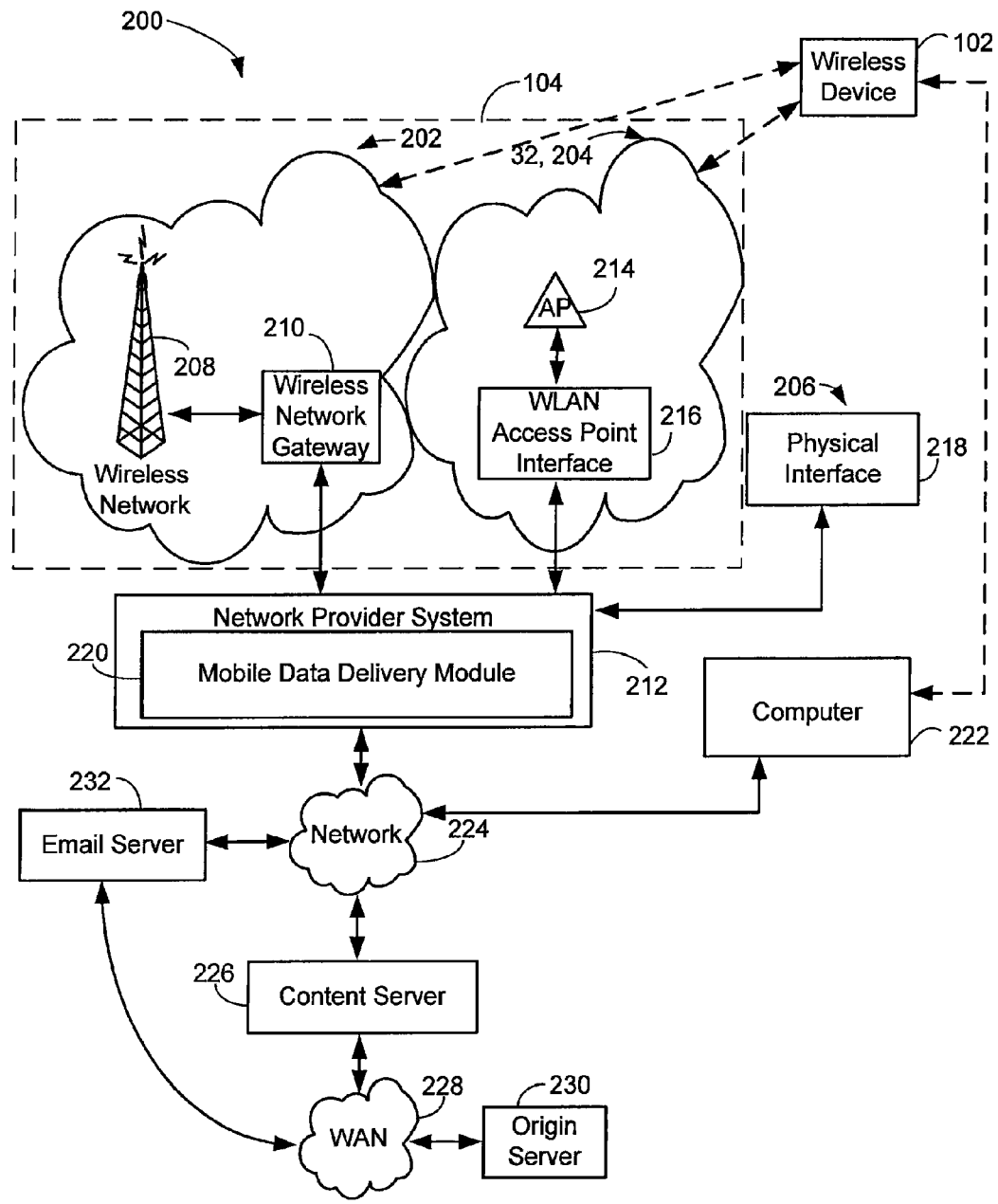
FIG. 2 shows a schematic diagram of a communication system suitable for providing an operating environment for a wireless device such as that shown in FIG. 1 in accordance with the disclosure herein.

Referring to FIG. 2, wireless WAN 202 may be implemented as a packet-based cellular or mobile network that includes a number of base stations 208 (one of which is shown in FIG. 2) where each of base stations 208 provides wireless Radio Frequency (RF) coverage to a corresponding area or cell. Wireless WAN 202 is typically operated by a cellular network service provider that sells subscription packages to users of wireless devices 102. Wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, communications system 200 also includes a wireless network gateway 210 and one or more network provider systems 212. Wireless network gateway 210 provides translation and routing services between network provider system(s) 212 and WAN 202, which facilitates communication between wireless devices 102 and other devices (not shown) connected, directly or indirectly, to network provider system 212.

WLAN 204 can comprise a network which can for example conform to IEEE 802.11 standards such as 802.11b, 802.11g, and/or 802.11n; however, other communications protocols may also be used for WLAN 204. WLAN 204 includes one or more wireless RF Access Points (AP) 214 (one of which is shown in FIG. 2) that collectively provide a WLAN coverage area. For the embodiment depicted in FIG. 2, WLAN 204 is operated by an enterprise (for example, a business or university in a building or campus type environment) and the access points 214 are connected to an access point (AP) interface 216. AP interface 216 provides translation and routing services between the access points 214 and network provider system 212 to facilitate communication between two or more of wireless devices 102 and other devices (e.g., such as desktop computers) connected, directly or indirectly, to network provider system 212. AP interface 216 is implemented using a computer, for example, a server running a suitable computer program or software.

According to some embodiments, the other interfaces 206 may be implemented using a physical interface indicated by reference 218. The physical interface 218 includes an Ethernet, Universal Serial Bus (USB), Firewire, or infrared (IR) connection implemented to exchange information between network provider system 212 and wireless device 102.

Network provider system(s) 212 can comprise server(s) or server module(s) which are typically located behind a firewall (not shown). Network provider system 212 may include a number of modules including a mobile data delivery module 220. Various modules running on network provider system 212 may be implemented as a number of services running on a single server or as a number of interconnected servers each running a software program to implement the functionality of the respective module. Network provider system 212 can provide access for wireless devices 102, through for example wireless WAN 202, WLAN 204, or other connection(s) 206 to the devices connected, for example, through an enterprise network 224 (e.g., an intranet), to network provider system 212. In various embodiments, data delivery module 220 is implemented on a computer, such as network provider system 212.

Enterprise network 224 can comprise one or more local area networks, intranets, the Internet, and/or direct connection(s), or combinations thereof. Enterprise network 224 may for example comprise an intranet for a corporation or other type of organization. In at least some embodiments, network provider system 212 can be part of an enterprise network 224, and located behind a corporate firewall and connected to wireless network gateway 210 through the Internet. A computer 222 (e.g., a desktop or laptop computer) belonging to the user of wireless device 102 is typically connected to enterprise network 224. As described earlier, wireless device 102 may be temporarily and directly connected to computer 222 using, for example, the serial port 152. Such direct connections may make use of a cradle or docking station connected to a serial port of computer 222, where wireless device 102 is placed in the cradle, therefore completing the serial connection between wireless device 102 and computer 222. Alternatively, wireless device 102 may communicate with computer 222 using communication subsystem 112 and WAN 202 and/or short-range communications subsystem 162 and WLAN 204.

As shown in FIG. 2, an application/content server 226 may be connected to enterprise network 224 and also to another network, for example Wide Area Network(s) (WAN(s)) 228. In some embodiments, email server(s) 232 and/or content server(s) 226 form part of enterprise network 224. WANs 228 may further connect to other networks. WAN 228 may comprise or be configured with the Internet, a direct connection, a LAN, a wireless communication link, or any combination(s) thereof. Content providers, such as Web servers, may be connected to WAN 228, an example of which is shown in FIG. 2 as an origin server 230.

According to various embodiments, mobile data delivery module(s) 220 provide connectivity between wireless WAN 202 and WLAN 204 and other connection(s) 206 and devices and/or networks connected directly or indirectly to network provider system 212. In some embodiments, connectivity provided may be Hypertext Transfer Protocol (HTTP) based connectivity providing an Internet based service connection to devices connected to wireless WAN 202, WLAN 204, or the other connection 206 and devices and/or networks connected directly or indirectly to network provider system 212. Network 224, application/content server 226, WAN 228, and origin server 230, may individually and/or collectively in various combinations provide content sources for network provider system 212. It will be appreciated that the system shown in FIG. 2 comprises but one possible communication network or configuration of a multitude of possible configurations for use with wireless devices 102.

Figure 3:
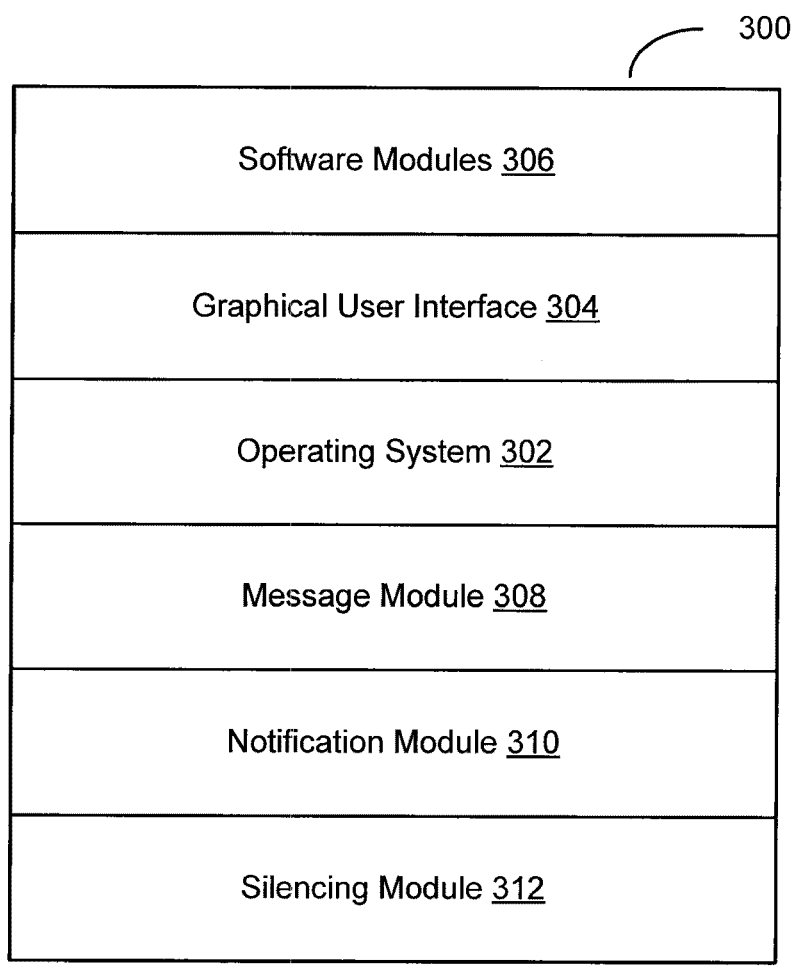
FIG. 3 shows a schematic diagram of an example of contents of a memory of a wireless device such as that shown in FIG. 1.

Reference is next made to FIG. 3, which shows a block diagram illustrating a memory 300 of wireless device 102 suitable for use in implementing systems and methods in accordance with the disclosure. Memory 300 has various software components for controlling wireless device 102 and may include, for example, any numbers of flash memory 144, RAM 146, ROM 148, memory module 130 and/or other device subsystems 164. In accordance with some embodiments, wireless device 102 is intended to be a multi-tasking wireless communications device configured for sending and receiving data items and for making and receiving voice calls that also includes various applications enabling users to, for example, listen to music, watch video files, play games, view picture files, surf the internet wirelessly, etc. To provide a user-friendly environment to control the operation of wireless device 102, an operating system (OS) 302 resident on wireless device 102 provides a basic set of operations for supporting various applications typically operable through a graphical user interface (GUI) 304. For example, operating system 302 can provide basic input/output system features to obtain input from auxiliary I/O 150, keypad 154, clickable thumb-wheel 160, and other input devices, and to facilitate output to the user via display 142. GUI 304 is typically a component of operating system 302. One or more software modules 306 for managing communications or providing a personal digital assistant (PDA) or other functions may also be included. Memory 300 can also include email and calendar clients, which may be combined in, for example, a PIM application having email-based calendaring and scheduling functions. Typically, the PIM is installed as one of the software modules 306.

Memory 300 can also include one or more message modules 308 which can be used to group electronic messages received by communication subsystem 112 of wireless device 102 into one or more message threads. For example, each electronic message in a particular message thread may be related to the same, or related, matter, or otherwise linked in a conversational or other communicative sense. A matter used to define or identify a thread could be, for example, a topic of conversation or an activity. Process(es) for grouping electronic messages into message threads will be described in greater detail below in relation to FIGS. 5 and 6.

Message module 308 may also comprise, or enable implantation of, one or more virtual (e.g., electronic) "folders", such as one or more inboxes. As will be understood by those skilled in the relevant arts, an inbox for use in processing electronic messages refers to a virtual "folder" containing one or more electronic messages—that is, a group of data records representing a group of messages, each of which comprises a flag or other suitably-adapted data item useful for identifying the records as associated with a common set identified as a "folder" analogous to a physical file folder. Standard applications used to manage electronic messages, such as, for example, electronic mail applications such as Microsoft Outlook™ generally allow a user to associate messages with one or more electronic folders by directly or indirectly setting suitable data flags or tags. This is generally referred to as storing a message in the folder. For example, a user may have different electronic folders for messages from friends, family, work, etc. An inbox generally refers to an electronic folder with which incoming messages may initially be associated.

For example, a data set representing a group or set of received e-mail messages stored in a memory 300 on or off a device 102 can comprise a number of different e-mail records. Each e-mail record can comprise a number of data items. Some of these items will include, for example, flags, or tags, or filters, which, as set at any given time, indicate whether an e-mail is to be associated with an 'inbox' data set or with some other virtual folder(s), so that when a user executes a command which will cause the contents of an e-mail database to be searched for suitable flags in order that an 'inbox' or other folder may be displayed, data records representing eligible e-mail communications will be noted, and data items identifying those communications (which are often a subset of the complete e-mail data set) will be included within a displayed folder data set, using a display 142, etc.

Thus, in some aspects an inbox or other virtual folder may be viewed as a flagged data set usable, for example, for writing to a display or other buffer, produced by reading all of the data within a given data set, such as a database, and writing selected data records, or data items useful for identifying data records, to a designated display or other buffer or memory.

Memory 300 can also include notification module(s) 310 for providing notifications to user(s) of a wireless device 102. Such notifications could include, for example, auditory user alerts such as ring tones, visual alerts such as flashing lights or pop-ups, and/or physical alerts such as vibrations. Notifications may be initiated upon the happening of certain events, such as when a new message is received by communication subsystem 112. When a new message is received by communication subsystem 112, microprocessor 140 may store the message in memory 300 and signal notification module 310 to indicate the arrival of the new message in any one or more of a very wide variety of ways. Notification module 310 may comprise one or more notification settings which may indicate how and when notifications should be activated. For example, a user of wireless device 102 may enable a notification setting which will cause a sound to be emitted each time a new communication is received. Other notification settings may indicate that a user only wishes to receive auditory notifications for specific types of communications, such as telephony communications. In other circumstances, a user may enable a notification setting which may prevent any auditory notifications from being emitted for any type of communication while the setting is enabled. Those of skill in the art will recognize that there may be many different types of notification settings, including visual alarms (including, for example, pop-up messages, blinking lights of one or more colors, frequencies, etc.) and/or physical alarms such as vibrators or shakers.

Memory 300 can also include a silencing module 312. Silencing module 312 provides the user of wireless device 102 with an option to silence a message thread determined by the message module 308. Message threads which have been silenced may be marked or flagged as silenced in memory 300 by, for example, setting a flag or other indicator in a data record associated with the message thread. When a new electronic message associated with a message thread which has been flagged as silenced is received, any previously-enabled notification setting(s) may be overridden and notification module 310 may be prevented from producing notifications for new messages added to the corresponding thread(s). In some embodiments, each of components 308, 310 and 312 may be part of the software modules 306. Alternatively, components 308, 310, 312, and 314 may be separate software components, as illustrated in FIG. 3.

Thus, wireless device 102 may include computer-executable programmed instructions for directing wireless device 102, and specifically, for example, microprocessor(s) 140, to implement various applications. Such programmed instructions may be embodied in one or more software modules 306 resident in memory 300 of wireless device 102. Alternatively, the programmed instructions may be tangibly embodied on a computer readable medium (such as a DVD, CD, floppy disk or other storage media) which may be used for transporting the programmed instructions to memory 300 of wireless device 102. Alternatively, the programmed instructions may be embedded in a computer-readable, signal-bearing medium that is uploaded to wireless network 104 by a vendor or supplier of the programmed instructions, and this signal-bearing medium may be downloaded through one or more of the interfaces 112, 150, 152, 162 to wireless device 102 from, for example, wireless network 104 by end users. Alternatively, specifically-configured special purpose circuitry, including for example dedicated integrated circuit boards or chips, can be provided.

Figure 4:
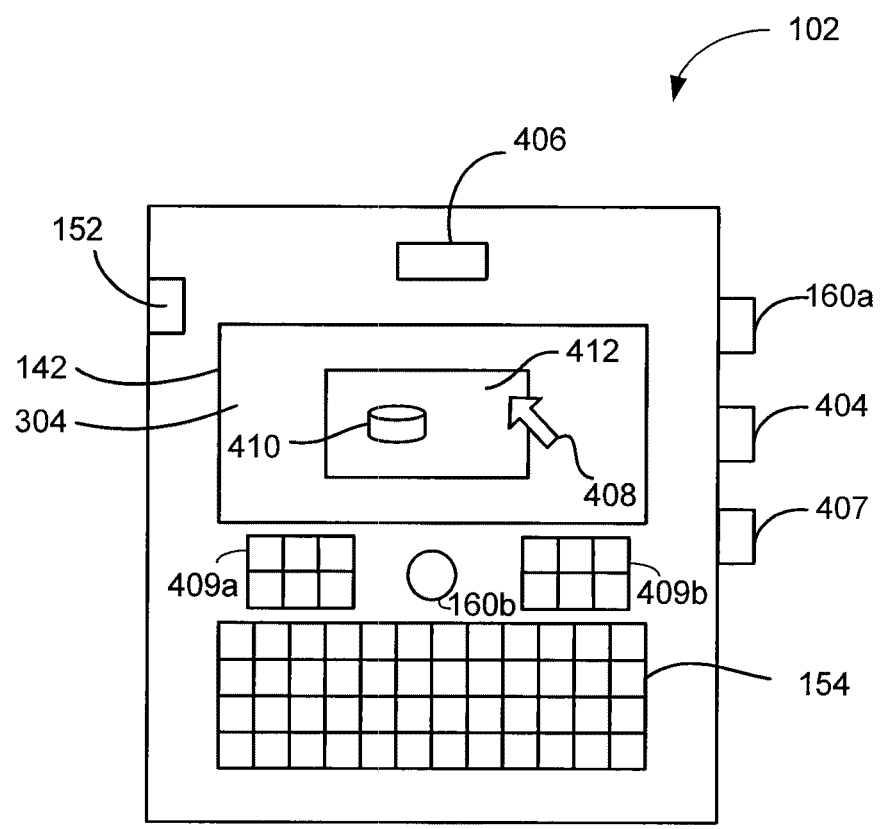
FIG. 4 is a front view illustrating a wireless device such as that shown in FIG. 1.

Reference is next made to FIG. 4, which shows a schematic front view of wireless device 102 suitable for use in implementing various aspects of the systems and processes disclosed herein. As mentioned above, a wireless device 102 may include systems, devices, and executable instruction sets configured to enable the device 102 to act as both a data and voice communications device. Wireless device 102 may include a casing, data or serial port(s) 152, display screen(s) 142, graphical user interface(s) (GUI) 304, keypad(s) 154, clickable thumbwheel(s) or scroll button(s) 160a, or other device(s), for navigation such as a trackball(s) 160b, one or more input buttons 404 (e.g., select, cancel, talk, play, stop, fast forward, rewind, next, previous buttons), signal inputs/outputs 407 (e.g., direct wire connection or inductive coupling power connector input, microphone, speaker, data interface input, etc.), and audio port(s) 406. Additionally, wireless device 102 may have a number of navigation control buttons represented by numerals 409a and 409b. Navigation control buttons 409 may provide a number of functions such as a send and/or end key for a mobile telephone application of wireless device 102, a menu key, an escape key, etc. The functions of navigation control buttons 409 may be user-configurable. Internally, wireless device 102 can include one or more circuit boards (not shown), microprocessors 140 (FIG. 1), memory(ies) 300 (FIG. 3), battery(ies) 138 (FIG. 1), antennae 118, 120 (FIG. 1), etc., which may all be coupled to the signal inputs/outputs 407, keypad(s) 154, display screen(s) 142, clickable thumbwheel(s) 160, etc.

Microprocessor(S) 140 are typically coupled to one or more input devices (e.g., buttons 404, keypad 154, clickable thumbwheel 160) for receiving user commands or queries and display 142 for displaying the results of these commands or queries. For example, user queries may be transformed into a combination of commands for producing one or more tables of output data which may be incorporated in one or more display pages for presentation to the user. Microprocessor 140 is also coupled to memory 300.

A user may interact with wireless device 102 and its software modules 306 using, for example, GUI(s) 304. GUI(s) 304 can be controlled by microprocessor(s) 140 executing, for example, an operating system 302 (FIG. 3), and can provide a display format enabling the user to choose commands, execute application programs, manage computer files, and perform other functions by selecting pictorial representations (i.e., icons), or selecting items from a menu through the use of an input or pointing device such as clickable thumbwheel 160 and/or keypad 154. Generally, a GUI 304 is used to convey information and receive commands from users and generally includes a variety of GUI objects or controls including icons, toolbars, drop-down menus, pop-up menus, text, dialog boxes, buttons, etc. A user typically interacts with a GUI 304 presented on display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, an object 410 may be highlighted (e.g., shaded) when it is selected or pointed at by the pointer or cursor 408 to indicate that object 410 is selectable.

Typically, a GUI-based system presents application, status, and other information to the user in windows appearing on display a 142. A window 412 is a display area shown within a display 142, typically rectangular, in which a user may view an application or document. A window 412 may be open, closed, displayed full-screen, reduced to an icon, increased or reduced in size, or moved to different areas of display 142.

Multiple windows 412 may be displayed simultaneously. For example, windows 412 may be displayed within other windows, overlapped with other windows, or tiled within the display area.

Figure 5:
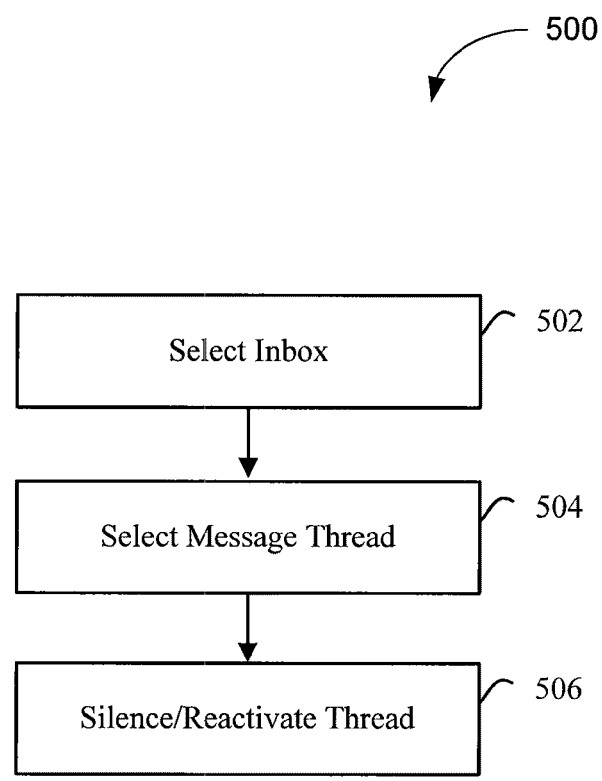
FIG. 5 shows a schematic flow diagram of an example method of silencing and reactivating a message thread in accordance with an embodiment.

Reference is now made to FIG. 5, which shows a flow diagram representing an example of a method 500 of silencing and reactivating a message thread according to one embodiment. Method 500 is suitable for use in, for example, a wireless device 102 of FIG. 1 in implementing various aspects of the disclosure herein.

A method 500 can begin at 502 where a user can, using suitably-configured GUI(s) and input device, select a message inbox. As explained above, an inbox generally refers to a virtual folder with which incoming messages are initially associated. Although the term "inbox" is used, it should be understood that the incoming messages are not necessarily email messages, and an inbox is not necessarily an email inbox. In general, it should be understood that incoming messages may be organized or flagged as belonging to or being associated with a certain defined group; or as satisfying certain criteria (e.g., is sent by a member of a defined group or contact list); and that such association with a group may be referred to as being associated with an inbox or virtual folder. When a user selects a folder, such as an inbox, for viewing, all of the messages associated with that folder may be displayed, as for example through use of data processing filtering techniques based on the use of flags or other identifying data items within relevant data records, on a user interface such as a GUI 304 on a display 142. Electronic messages received by, for example, communication subsystem 112 may be stored in memory 300 along with some indication of the electronic folder(s) with which the message is currently associated, i.e., a memory 300 may comprise a data set comprising one or more data records representing electronic messages which may comprise data items representing, for example, suitably-configured flags identifying record for inclusion within, for example, an inbox data set, such that incoming messages may be presented as part of a displayed 'inbox' data set. It should be understood that the current application is not limited to any particular messaging application nor to any particular implementation as to how electronic messages may be stored in memory.

In various embodiments, some incoming messages may be routed to electronic folder(s) other than an inbox, such as a junk mail folder or other default folder based on content and/or various flags or tags associated with the message(s), or may be otherwise handled or disposed of. Electronic folders containing only messages which meet some automatically applied predetermined screening or filtering criteria for unwanted messages, such as predetermined criteria employed by a spam or junk mail filter, are generally not considered to be inboxes.

Some or all of the electronic messages associated with an inbox may be grouped into, or otherwise associated with, one or more message threads. For example, in some embodiments, a data record stored in memory 300 which is associated with an electronic message may be modified to include an indication of the message thread to which the message belongs. Messages in a message thread may, for example, relate to a particular subject matter, such as a topic of conversation or activity. For example, if an ongoing discussion occurs between a number of users using, for example, the "reply" or "reply to all" features of many email applications, all the messages relating to that conversation could be identified as belonging to a particular message thread. Messaging applications, such as electronic mail applications, may have various ways of determining which messages belong to an ongoing discussion. For example, in various embodiments a filter algorithm may be applied to a subject line of an electronic message and/or the body of an electronic message in order to determine to which message thread it relates. Those skilled in the art will appreciate that there may be many different methods of associating a particular electronic message with a message thread.

In some embodiments, a message inbox may be implemented as a group inbox associated with a pre-determined group of users. For example, as explained above, a user/device may be authorized to access a definable group communications functionality which provides, for example, the capability of group discussions, or communications, such as a BlackBerry™ Group. Such group functionality (also referred to as a group "site") may allow data to be shared between and updated by any or all members of a defined user group, and may allow electronic messages to be sent to the group "site" by any or all group members. As with other messaging applications, a group site may comprise one or more virtual folders, or other group-accessible databases, with which electronic messages generated by group members may be associated and accessed. When, for example, a group discussion is initiated regarding a particular matter or topic of conversation, electronic messages received in association with that discussion may be associated with a particular electronic folder associated with and accessible by members of the group. Such virtual group folders can be referred to as group inboxes. Alternatively, each message received may be associated with a single inbox, regardless of the topic to which they relate. When messages in such a single inbox are displayed on, for example, display 142, some indication of the group discussion to which they relate may also be displayed.

Messages pertaining to, or otherwise previously associated with, a particular group discussion or matter are an example of messages which may be considered to form a message thread. Some message threads may relate to a particular topic of conversation. For example, if the group site is a site for use by a book club, the topic of conversation could relate to a discussion of the location for the next meeting. Alternatively, the message thread could relate to an activity occurring in the group site. For example, Blackberry™ Groups allows photos to be uploaded to the site and allows lists (such as grocery lists) to be posted and updated. A member of the group can submit a comment regarding a photo or a list. Similarly, members of a group can view the location of other group members on a map. A group discussion can be started in relation to the location of one or more group members at a given time. Each message posted by a group member regarding a particular photo or list or the location of one or more group members may be identified as belonging to one of one or more message threads. Threads may be defined in a very wide variety of ways, and may include communications generated by any of a very wide variety of users, devices, and/or other sources.

Thus, the inbox selected at 502 could relate to, for example, an instant messaging group discussion. Such group conversations can be considered message threads.

At 504, the user selects a message thread using, for example, a user interface such as a GUI 304, displaying one or more selectable options such as a list of one or more message threads. A message thread may be selected by the user by, for example, selecting a displayed, selectable option associated with the message thread using point-and-click functionality as described above.

Figure 10:
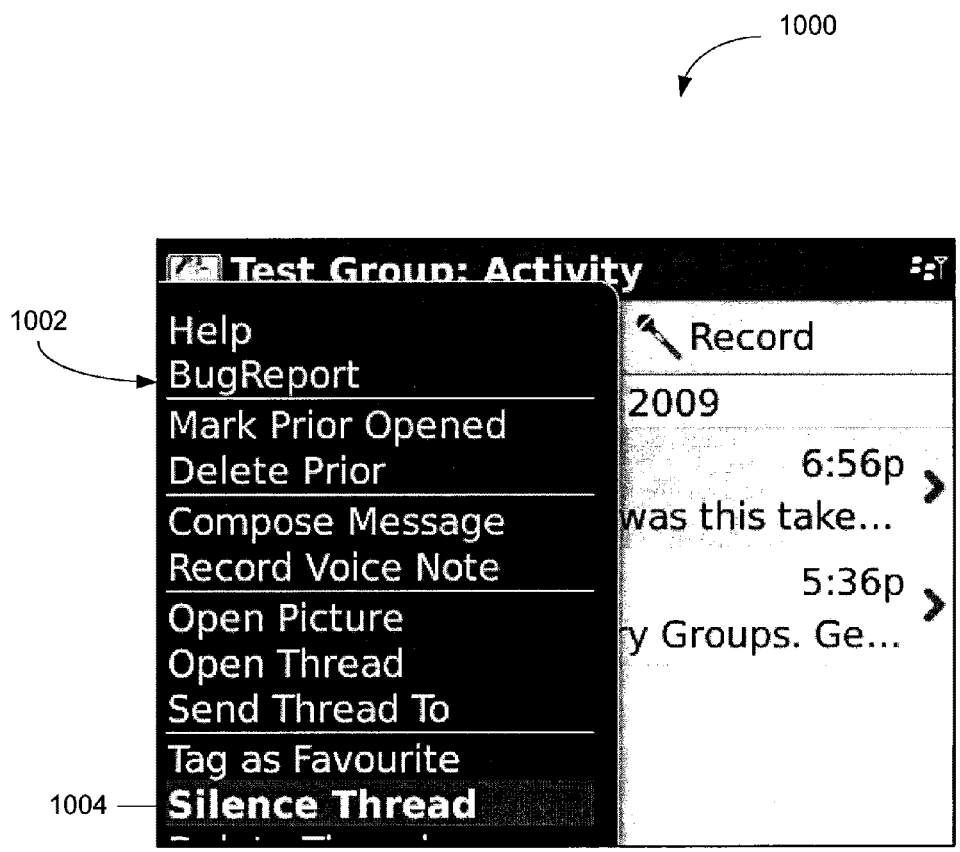
FIG. 10 is a screen shot showing a menu suitable for silencing a message thread in accordance with one embodiment.
Figure 11:
FIG. 11 is a screen shot showing a menu suitable for reactivating a message thread in accordance with one embodiment.

At 506, a user can silence a message thread or reactivate a message thread that had previously been silenced with respect to a device the user is using. This can, for example, be accomplished using a user interface such as a GUI 304, with one or more selectable options displayed, for example, on display 142. As is known in the art, user interfaces may provide various types of selectable options such as, for example, check boxes, radio boxes, lists and drop down menus, such as shown in FIGS. 10 and 11. The selectable options may be selected by the user as explained above in relation to FIG. 4. A message thread which has been silenced may be marked or flagged as silenced in memory 300 by, for example, setting a flag or other indicator in a data record associated with the message thread.

As explained above, one or more notification settings may be enabled for wireless device 102. When a new electronic message associated with a message thread which has been flagged as silenced is received, any currently enabled notification settings may be overridden and notification module 310 may be prevented from producing notifications for the new message. Thus, when a user silences a thread, the user will no longer receive notifications (e.g. ring tones, flashing lights or vibrations) when a new message arrives belonging to the silenced message thread. If the inbox is shared, such as in the case of a group inbox of a group site or an instant messaging group discussion, only the member(s) of the group who have silenced the thread may cease to receive notifications for new messages in the thread. Notifications to members who have not silenced the thread will be unaffected.

New messages in a silenced message thread may still be associated with an inbox and displayed with the inbox contents. In some embodiments, new messages received for a silenced message thread may appear to be greyed out or otherwise diminished in appearance when displayed with an inbox contents. That is, when the messages in an inbox are displayed, for example on display 142, new messages in a silenced message thread may be displayed in a different manner, such as, for example, using a differently-colored or styled font. If the inbox is shared, such as in the case of a group inbox of a group site or an instant messaging group discussion, only the member(s) of the group who have silenced the thread may see the messages as greyed out. The display of messages to members who have not silenced the thread will be unaffected.

When a user who has silenced a message thread reactivates that thread, that user may again receive notifications (e.g. ring tones, flashing lights or vibrations) when a new message is received belonging to the message thread. Messages associated with such a reactivated message thread may no longer appear to be greyed out or otherwise diminished in appearance when displayed with the inbox contents on, for example, display 142. If the inbox is a group inbox of a group site or an instant messaging group discussion, only the member of the group who has reactivated the thread will be affected. When a message thread has been reactivated the mark or flag which indicated the thread as silenced in memory 300 by may be removed by, for example, unsetting a flag or other indicator in a data record associated with the message thread.

In some embodiments, when a user joins a group discussion, such as an instant messaging discussion, or a new member joins a group site, such as described above, they may only receive notifications for those messages which were posted after they joined the group discussion or group site. For example, when a new member joins a group site, any messages with a timestamp older than when the group was created locally (i.e. when the member joined the group) may be automatically silenced.

Figure 6:
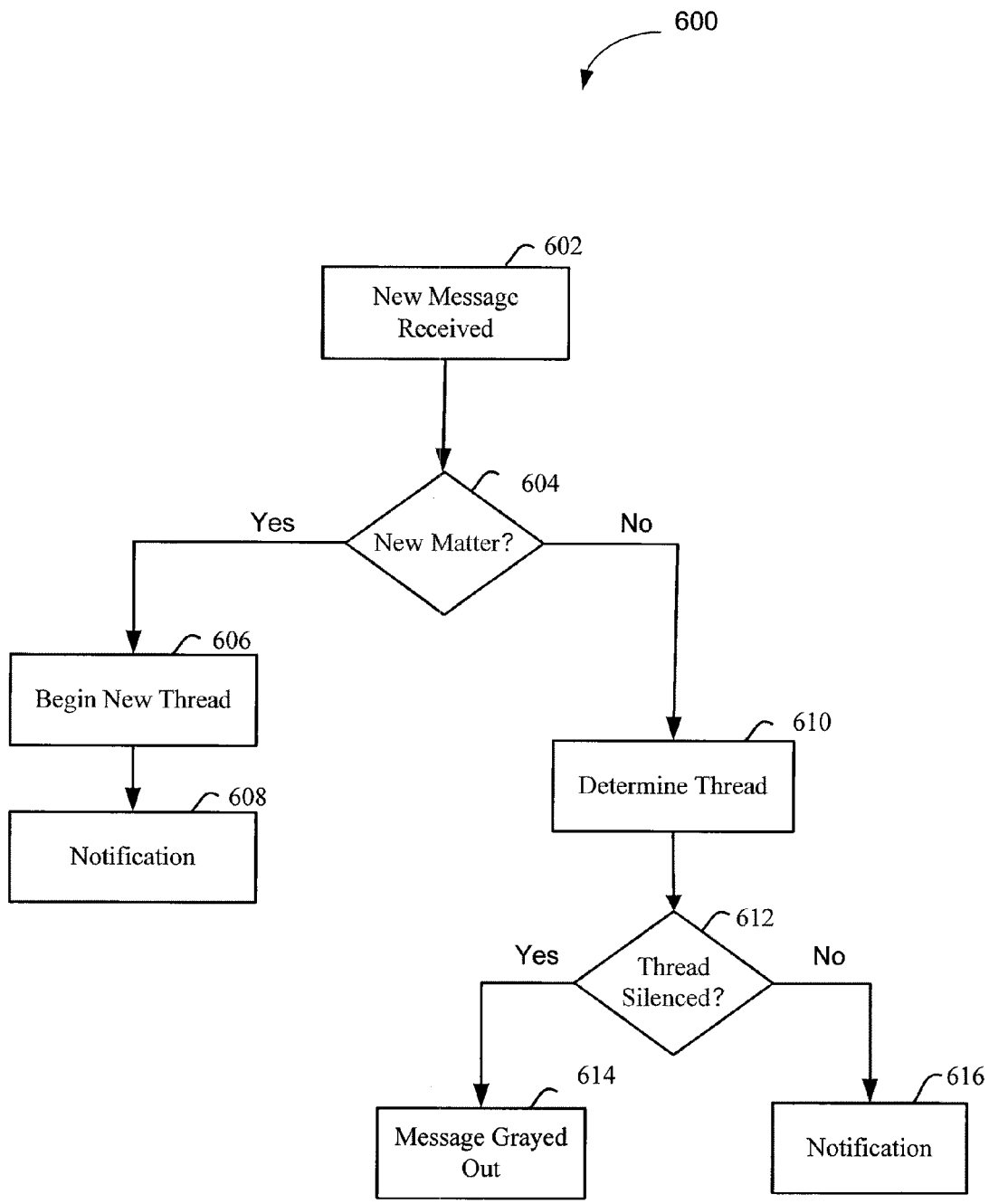
FIG. 6 shows a schematic flow diagram of an example method for receiving a message in accordance with an embodiment.

Reference is now made to FIG. 6, which shows a flow diagram representing an example of a method 600 of handling a message contained in or to be routed to an inbox according to one embodiment. Such a method 600 is suitable for use in, for example, a wireless device 102 such as that shown in FIG. 1, using processing procedures and components as described above.

A method 600 can begin at 602 where a message is received which is addressed or otherwise identified in such a way as to be associated with an inbox. As mentioned above, the message can be a message posted to a group inbox by a member of a group site or it can be an individual message received, for example, in a user's email inbox. In some embodiments, the message could also be an instant message submitted as part of an instant messaging group discussion. In some embodiments, the inbox with which a message is associated may be inherent in the message itself, such as where a message is posted to a particular group inbox, or it may be determined based on protocols or settings of an application managing the messages, such as the electronic mail or instant messaging application.

At 604, it may be determined whether or not the message relates to a new matter, such as a new topic of conversation or a new activity. If the message relates to a topic of conversation, determining whether or not the message relates to a new matter may involve determining if the message is a reply to a previous message sent or received by the user. In some embodiments, a subject line of a message may be compared to the subject line of other messages to determine if the message relates to a new matter. If the message relates to an activity, such as a list, posted photograph or member location, determining whether or not the message relates to a new matter may involve determining whether the list, photograph or location had previously been commented on.

If the message does relate to a new matter, at 606, a new message thread is started. At 608, the user is notified of the message according to any currently-enabled notification settings, as described above.

If the message does not relate to a new matter, at 610, a thread to which the message belongs may be determined. This may be done, for example, by determining that the new message is in reply to a previous message, by matching key words included in content portions of the message data set, or by using suitably-configured and processed data records or items to determine a list, photograph or other image, or location, etc., to which a message relates.

At 612, it is may determined whether or not the message thread to which the message belongs has been silenced by the user. For example, a data record in memory 300 which is associated with the message thread may be checked to determine whether a flag has been set indicating that the thread has been silenced. If the message thread has been silenced by the user then no notification may be activated and at 614 the message may appear "greyed out" or other diminished fashion when displayed with the inbox contents. If the message thread has not been silenced by the user, then at 616 the user may be notified of the incoming message according to any currently-enabled notification settings.

While the embodiments of methods 500 and 600 comprise actions or steps shown as occurring in a particular order, it will be appreciated by those skilled in the art that many of the blocks are interchangeable and may occur in different orders than that shown without materially affecting the end results of the methods 500 and 600.

Figure 7:
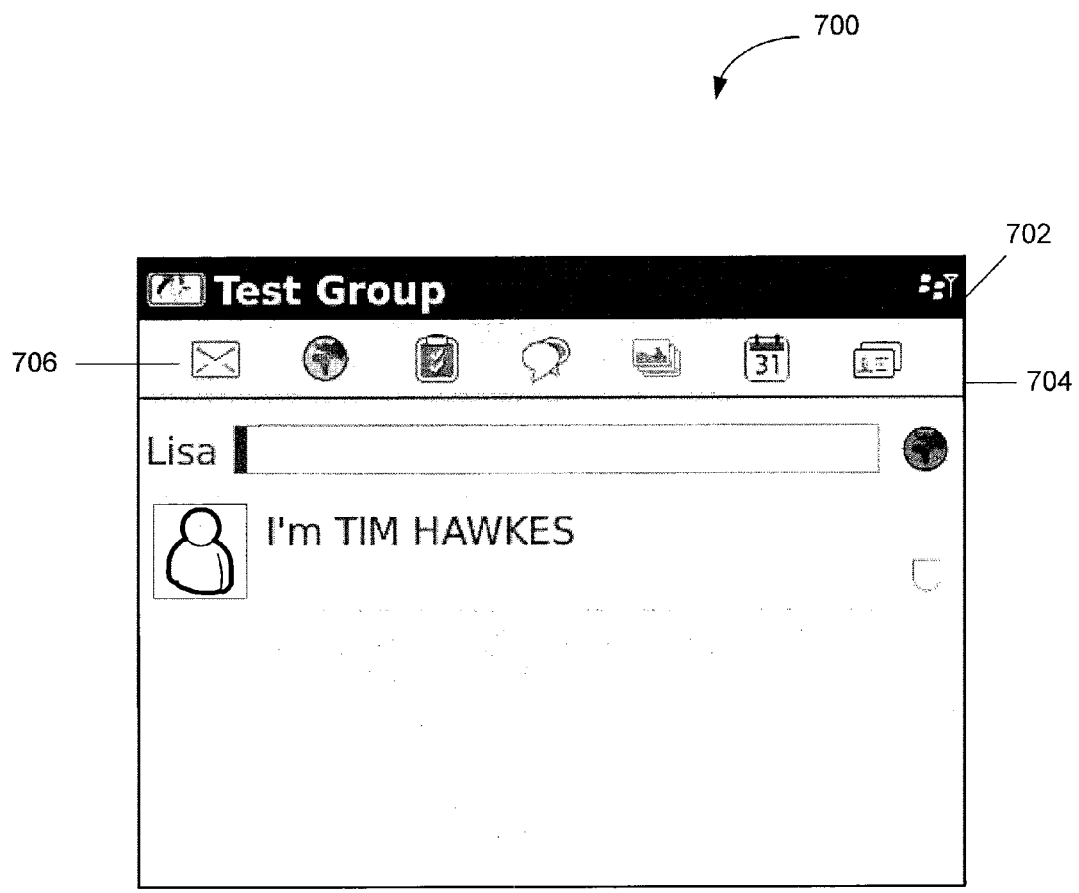
FIG. 7 is a screen shot showing a group home page in accordance with an embodiment.

Referring now to FIG. 7, a display 700 is shown displaying a main page of a group site according to one embodiment. The display 700 could, for example, be displayed on display 142 of wireless device of FIG. 1 through the implementation of processes and components described above. Reference will be made to FIG. 1 where appropriate.

A title bar 702 of the display 700 shows the name of the group site. An activity bar 704 of the display 700 may display various interactive icons which can be used to navigate to areas of the group site, by, for example, use of one or more input devices 154, 158, 160 as described above. Activity bar 704 includes a letter icon 706 used to open the group inbox (i.e. display the group inbox on display 142). A member of the group can open the group inbox by selecting letter icon 706 using, for example, one or more input devices 154, 158, 160 as described above.

Figure 8:
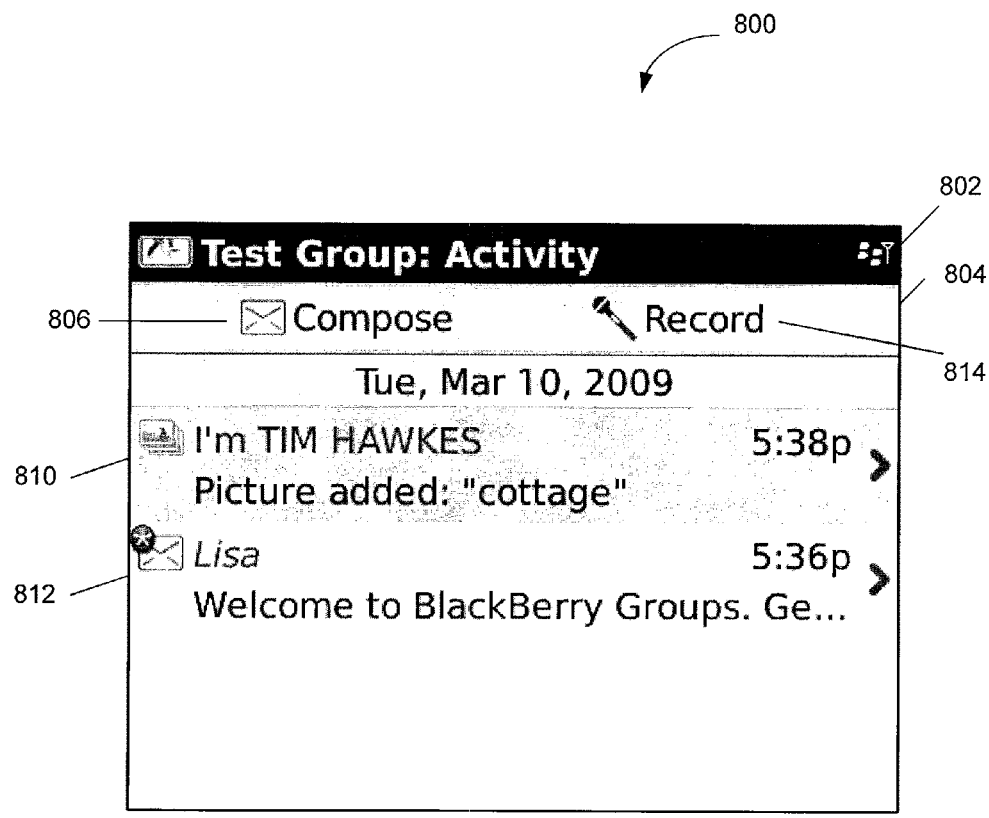
FIG. 8 is a screen shot showing a group message inbox in accordance with an embodiment.

Referring now to FIG. 8, a display 800 is shown displaying a group inbox of a group site according to one embodiment. This could, for example, be displayed on display 142 of wireless device of FIG. 1 by implementing processes and using components described above. Reference will be made to FIG. 1 where appropriate.

A title bar 802 of the display 800 shows the current location of the display within the group site. For example, the title bar 802 may indicate the electronic folder which is currently being displayed. An activity bar 804 of the display 800 contains a "compose" icon 806 which can be used to invoke functionality which will allow a user to compose a new text-based message. The activity bar 804 also contains a record icon 814 which can be used to invoke functionality which will allow a user to record a new voice message.

In FIG. 8, data identifying two message threads 810 and 812 are displayed. Data identifying the first message thread 810 indicate that the thread relates to a picture which has been uploaded to the group site. A message thread 810, 812 can be selected by a group member using, for example, keyboard 154 or thumbwheel 160 of wireless device 102 as explained above in relation to FIG. 4. When a message thread 810, 812 has been selected, corresponding messages in the selected message thread may be displayed as shown in FIG. 9.

Figure 9:
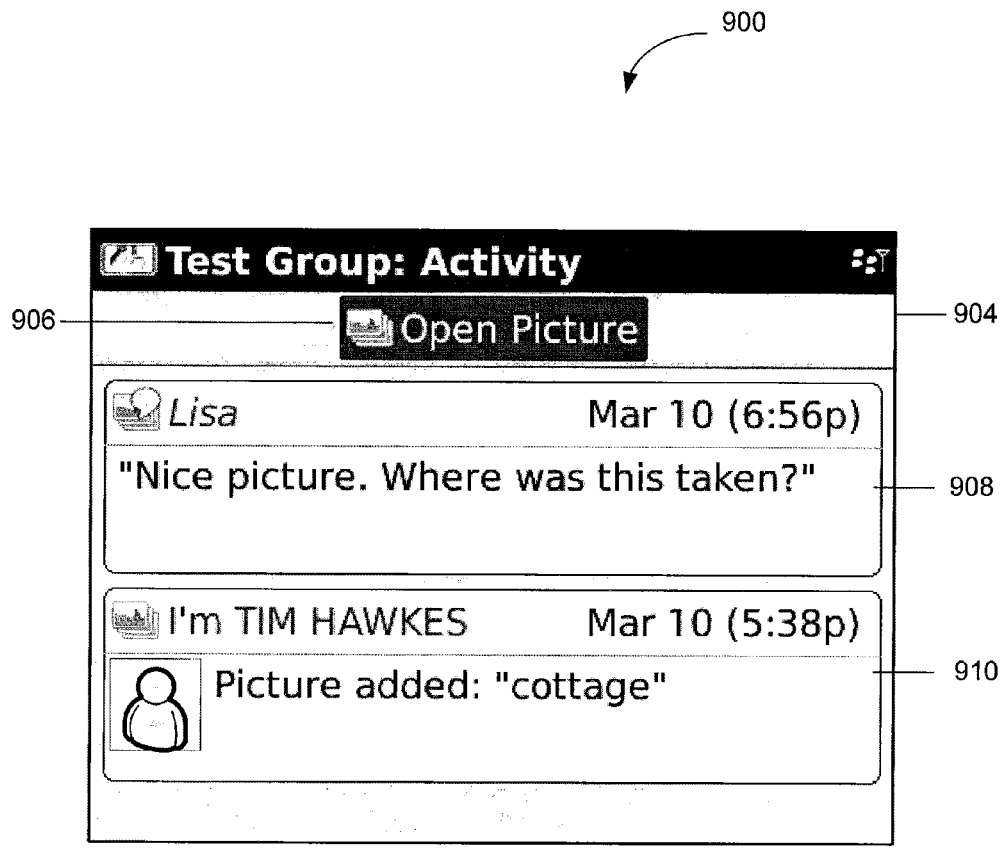
FIG. 9 is a screen shot showing a messages for a message thread in accordance with an embodiment.

Referring now to FIG. 9, a display 900 is shown displaying messages in a message thread according to one embodiment. This could, for example, be displayed on display 142 of wireless device of FIG. 1 through the use of processes and components described above. Reference will be made to FIG. 1 where appropriate.

In the example shown in FIG. 9, the selected message thread relates to a photograph posted by one of the members of the group site. An activity bar 904 displays an icon 906 which can be used to invoke functionality which will allow a user to open the picture associated with the message thread for display. Two messages 908 and 910 in the currently selected message thread are displayed.

Referring now to FIG. 10, a display 1000 is shown displaying messages in a message thread and a drop down menu according to one embodiment. This could, for example, be displayed on display 142 of wireless device of FIG. 1 through the application of processes and components described above. Reference will be made to FIG. 1 where appropriate. A drop down menu 1002 for initiating actions related to a selected message thread is displayed on display 1000. A drop down menu is an interactive component of a graphical user interface which allows a user to select one or more options, for example using one of the techniques described above, which may initiate one or more commands or applications. Menu 1002 includes an option 1004 for silencing the current message thread. The option 1004 can be selected by a group member using, for example, keyboard 154 or thumbwheel 160 of wireless device 102 as described above. When the silencing option is selected, the current message thread may be marked or flagged as silenced. For example, in some embodiments, a data record in memory 300 associated with the message thread may be flagged.

Once a message thread has been silenced, the messages in the message thread may appear "greyed out," or in otherwise visually diminished form (e.g., through the use of less prominent or eye-catching colors, reduced or less-discreet font sizes, etc.) to the member of the group site who has silenced the thread and that member will no longer receive notifications of new messages added to the thread, as explained above. Other members who have not silenced the thread may still receive notifications of new messages added to the thread.

Referring now to FIG. 11, a display 1100 is shown displaying messages in a message thread and a drop down menu according to one embodiment. This could, for example, be displayed on display 142 of wireless device of FIG. 1 including processes and components described above. Reference will be made to FIG. 1 where appropriate.

A drop down menu 1102 for initiating actions related to the message thread is displayed on display 1100. In this case, the message thread had been silenced by the member currently viewing the thread and hence, menu 1102 includes an option 1104 for reactivating the current message thread. The option 1104 can be selected by a group member using, for example, keyboard 154 or thumbwheel 160 of wireless device 102 as described above. Once the message thread has been reactivated, the member who has reactivated the thread may again receive notifications of new messages added to the thread and the messages in the thread may no longer appear to be greyed out. The message thread may only be reactivated for the member who selected the option 1104 to reactivate the thread.

While the invention has been described and illustrated in connection with specific, presently-preferred embodiments, many variations and modifications may be made without departing from the spirit and scope of the invention. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

The invention claimed is:

1. A communication system configured to silence notifications for incoming electronic messages, the system comprising a data processor, non-transitory media readable by the data processor and a communications subsystem:

the communication subsystem adapted for receiving the incoming electronic messages; and the non-transitory media readable by the data processor comprising coded program instructions adapted to cause the processor to:

receive a selected message thread for silencing;

in response to receiving the selected message thread, activate a flag stored in the non-transitory media in association with the selected message thread, wherein the flag indicates that the selected message thread has been silenced;

determine that a new incoming electronic message is associated with the selected message thread;

determine that the selected message thread has been flagged as silenced using the flag stored in the non-transitory media;

override a currently-enabled notification setting to prevent a receipt notification pertaining to new incoming electronic messages associated with the selected message thread from being activated; and display the new incoming electronic message in an inbox together with any message thread not flagged as silenced, while silencing any further notifications pertaining to receipt of the new incoming electronic message, wherein the new incoming message thread flagged as silenced is displayed in the inbox in a different manner than any message thread not flagged as silenced.

2. The system of claim 1, wherein the new incoming electronic message is part of a group discussion.

3. The system of claim 2, wherein a receipt notification for a new incoming electronic message is prevented only for a user who has flagged the message thread as silenced.

4. The system of claim 1, wherein the inbox is one of a group inbox or an email inbox.

5. The system of claim 1, further comprising at least one display for displaying the incoming electronic messages.

6. The system of claim 5, wherein, if the message thread has been flagged as silenced, electronic messages in the message thread appear diminished in appearance.

7. The system of claim 1, further adapted to allow the message thread to be unflagged deactivating the flag.

8. The system of claim 7, further adapted to, after determining that the message thread has been unflagged, retain the new incoming message associated with the inbox while allowing notifications pertaining to receipt of any subsequent new incoming message for the message thread, and associate any subsequent new incoming message with the inbox.

9. The system of claim 1, wherein the system comprises a wireless device.

10. The system of claim 1, wherein the notifications include one or more of an auditory alert, a visual alert or a physical alert.

11. The system of claim 1, wherein the new incoming message is displayed in a default view of the inbox.

12. The system of claim 1, wherein the coded program instructions further cause the processor to store the new incoming message in the inbox.

13. A method for silencing notifications for incoming electronic messages to a communication system, the communication system comprising a data processor, media readable by the data processor and a communications subsystem, the communications subsystem adapted to receive the incoming electronic messages, the method comprising:

receiving one or more selected message threads for silencing;

in response to receiving the one or more selected message threads, activating one or more flags, each flag in association with a selected message thread of the one or more selected message threads, wherein the one or more flags indicate that the associated one or more selected message threads have been silenced;

receiving a new incoming electronic message;

identifying the new incoming message as associated with the selected one or more message threads;

determining that a message thread associated with the new incoming message has been flagged as silenced using the one or more flags;

overriding at least one currently-enabled notification setting to prevent a notification pertaining to receipt of the new incoming message from being activated; and displaying the new incoming electronic message in an inbox together with any message thread not flagged as silenced, while silencing any further notifications pertaining to receipt of the new incoming electronic message;

wherein the new incoming message thread flagged as silenced is displayed in the inbox in a different manner than any message thread not flagged as silenced.

14. The method of claim 13, wherein the new incoming electronic message is part of a group discussion.

15. The method of claim 14, wherein a receipt notification for a new incoming electronic message is prevented only for a user who has flagged the message thread as silenced.

16. The method of claim 13, wherein the inbox is one of a group inbox or an email inbox.

17. The method of claim 13, further comprising displaying the incoming electronic messages.

18. The method of claim 17, wherein, if the message thread has been flagged as silenced, electronic messages in the message thread appear diminished in appearance.

19. The method of claim 13, further adapted to allow the message thread to be unflagged by deactivating the flag.

20. The method of claim 19, further comprising, after determining that the message thread has been unflagged, retaining the new incoming message associated with the inbox while allowing notifications pertaining to receipt of any subsequent new incoming message for the message thread, and associating any subsequent new incoming message with the inbox.

21. The method of claim 13, wherein the notifications include one or more of an auditory alert, a visual alert or a physical alert.

22. The method of claim 13, wherein the new incoming message is displayed in a default view of the inbox.

23. The method of claim 13, further comprising storing the new incoming message in the inbox.

24. A non-transitory computer readable medium comprising processing instructions which when executed by a data processor cause the data processor to perform a method for silencing notifications for incoming electronic messages to a communication system, the method comprising:

receiving one or more selected message threads for silencing;

in response to receiving the one or more selected message threads, activating one or more flags, each flag in association with a selected message thread of the one or more selected message threads, wherein the one or more flags indicate that the associated one or more selected message threads have been silenced;

receiving a new incoming electronic message;

identifying the new incoming message as associated with the selected one or more message threads;

determining that a message thread associated with the new incoming message has been flagged as silenced using the one or more flags;

overriding at least one currently-enabled notification setting to prevent a notification pertaining to receipt of the new incoming message from being activated; and displaying the new incoming electronic message in an inbox together with any message thread not flagged as silenced, while silencing any further notifications pertaining to receipt of the new incoming electronic message;

wherein the new incoming message thread flagged as silenced is displayed in the inbox in a different manner than any message thread not flagged as silenced.

* * * * *